United States Patent [19]

Carroll et al.

[11] Patent Number: 4,726,953

[45] Date of Patent: Feb. 23, 1988

[54] SWEET FLAVORFUL SOFT FLEXIBLE SUGARLESS CHEWING GUM

[75] Inventors: Thomas J. Carroll, Oak Ridge; Walter R. Hopkins, Bridgewater, both of N.J.

[73] Assignee: Nabisco Brands, Inc., Parsippany, N.J.

[21] Appl. No.: 914,025

[22] Filed: Oct. 1, 1986

[51] Int. Cl.$^4$ .............................................. A23G 3/30
[52] U.S. Cl. ......................................... 426/5; 426/548
[58] Field of Search ........................................ 426/3–6, 426/548

[56] References Cited

U.S. PATENT DOCUMENTS

| | | | |
|---|---|---|---|
| 3,795,744 | 3/1974 | Ogawa et al. | 426/3 |
| 4,248,894 | 2/1981 | Mackay et al. | 426/3 |
| 4,271,197 | 6/1981 | Hopkins et al. | 426/3 |
| 4,382,962 | 5/1983 | Devos et al. | 426/3 |
| 4,514,422 | 4/1985 | Yang | 426/3 |

Primary Examiner—Jeanette Hunter
Attorney, Agent, or Firm—Richard Kornutik

[57] ABSTRACT

Soft, flexible sugarless chewing gum having a moisture content of about 2 to 7% and improved sweetness and flavor characteristics over extended periods of mastication time are provided by formulating gum base with unencapsulated saccharin, encapsulated saccharin, cooked aqueous hydrogenated starch hydrolysate having a moisture content of about 10±6%, and, optionally, glycerine.

8 Claims, 8 Drawing Figures

SWEET FLAVORFUL SOFT FLEXIBLE SUGARLESS CHEWING GUM

FIELD OF THE INVENTION

The present invention relates to soft, flexible sugarless chewing gum compositions which contain ≧2% by weight of moisture and ≧8% by weight of cooked hydrogenated starch hydrolysate and which have improved sweetness and flavor characteristics over extended periods of mastication time.

DESCRIPTION OF THE PRIOR AND/OR RELATED ART

Relatively soft sugarless chewing gum compositions have been provided by some recently developed technology which is designed around the use of relatively large amounts, i.e., ≧8% by weight, of a softening agent such as glycerine or propylene glycol, with relatively large amounts of sugar alcohols, and optionally, small amounts of intense sweeteners such as saccharin and aspartame, in chewing gum products that must be made under relatively anhydrous conditions and/or which have a final total moisture content of ≦1 to 2%.

These products, however, have various disadvantages, from a commercial point of view, i.e., because of the need to make them under anhydrous-type conditions they are relatively expensive to make from a manufacturing point of view; and because of their compositions and low moisture contents they tend to readily deliquesce upon exposure to the ambient atmosphere at relative humidities of about 55 to 80; at 25° C., and thus require stringent packaging precautions to offset such problems during the storage and shelf life thereof.

Although these products have relatively soft texture they suffer to some extent with respect to their flavor and/or sweetness properties in that high concentrations of glycerol can impart excessive slippery mouthfeel and "warming" sensations that may not be the desired effect of the flavoring system employed in such products. The use of large amounts of propylene glycol would provide an imbalanced flavor system and an over plasticization of the elastomer based gum bases.

Aqueous hydrogenated starch hydrolysate having a moisture content of about 20 to 35% has been used as a stabilizer for aspartame in chewing gum and other comestibles that may have a moisture content of 2 to 8% as disclosed in U.S. patent application Ser. No. 865,493 filed May 20, 1986 in the names of D. R. Friello, et al., and entitled "Comestible Containing Moisture and Shelf Storage Stabilized L-Aspartic Acid Derivative, and Ser. No. 867,821 filed May 27, 1986 in the names of D. R. Friello et al. and entitled "Comestible Containing Moisture, CaCO$_3$ and Shelf Storage Stabilized L-Aspartic Acid Derivative".

Chewing Gum products made with ≧8% glycerine that are shelf stable and do not deliquesce at relative humidity of 45 to 65% at 20° C., and which may contain aqueous hydrogenated starch hydrolysate are disclosed in U.S. patent application Ser. No. 677,718 filed Dec. 4, 1984 in the names of R. A. Reggio et al. and entitled "Moisture Stable Chewing Gum."

Comestibles such as chewing gum which are soft and which contain ≧2% moisture and aspartame, and which also contain cooked aqueous starch hydrolysate which may have a moisture content of about 10±6% are disclosed in U.S. patent application Ser. No. 717,765 filed Mar. 29, 1985, and a continuation-in-part of said Ser. No. 717,765, Ser. No. 840,300 filed Mar. 14, 1986, both filed in the names of Thomas J. Carroll, et al., and entitled "Flexible Sugarless Chewing Gum"; and U.S. patent application Ser. No. 717,630 filed Mar. 29, 1985, and a continuation-in-part of said Ser. No. 717,630, Ser. No. 840,299, filed Mar. 14, 1986, both filed in the names of Thomas J. Carroll, et al. and entitled "Stabilized APM In Comestibles".

Attempts were made by the present inventors to make a soft chewing gum product containing about 2 to 4% moisture, and 8% glycerine and saccharine as an intense sweetener with a synthetic elastomer based gum base. However, products made with this technology had poor sweetness and flavor retention properties, without any improved benefits in softeners, as compared to the softness of chewing gum products made with glycerine and various other synthetic elastomer based gum bases.

Prior to the present invention, therefore, it has not been readily possible to provide soft chewing gum that has long term sweetness and flavor retention characteristics where the chewing gum is to be sweetened with saccharin and it is to contain about 2 to 4% moisture and is to also have a consistent, non-varying chew profile during the mastication life of the product, and wherein the bolus of the masticated product does not stiffen up considerably during such life of the product, and wherein the product provides a relatively constant level of sweetness, having a slow gradual level of sweetness drop-off over such period of time.

An object of the present invention is to provide soft (bubble gum and non-bubble gum) chewing gum products containing about 2 to 7 and preferably about 2 to 4% moisture and sweetened, at least in part, by saccharin, which have relatively long term sweetness and flavor retention properties.

It is also an object of the present invention to provide such chewing gum products which have a consistent, non-varying chew profile during the mastication life of the product.

It is also an object of the present invention to provide such chewing gum products wherein the bolus of the masticated product does not stiffen up considerably during such life of the product.

It is also an object of the present invention to provide such chewing gum products which provide a relatively constant level of sweetness, having a slow gradual level of sweetness drop-off over such period of time.

SUMMARY OF THE PRESENT INVENTION

It has now been found, according to the present invention, that soft chewing gum products can be made which have relatively long term sweetness and flavor retention properties and which are sweetened, at least in part, with saccharin and which contain about 2 to 7 and preferably about 2 to 4% moisture, by formulating gum base, aqueous hydrogenated starch hydrolysate, encapsulated saccharin, unencapsulated saccharin, optionally, glycerin, and about 2 to 7% moisture, with other optional ingredients, as otherwise disclosed hereinbelow.

DESCRIPTION OF THE PREFERRED EMBODIMENT

Gum Base

The composition of the gum base used in the chewing gum compositions of the present invention will vary depending on whether the gum base is to be used in a chewing gum product which is to be a regular, or non-bubble, gum product or a bubble gum product. For use in making a bubble gum or regular chewing gum product, the following gum base formulations may be used, in accordance with the present invention:

| | Weight percent of component in gum base for | | | |
|---|---|---|---|---|
| | Bubble Gum Product | | Regular Gum Product | |
| | Broad Range | Preferred Range | Broad Range | Preferred Range |
| Masticatory material | 8–22 | 9–18 | 8–25 | 9–18 |
| plasticizer for masticatory material | 5–35 | 10–20 | 2–30 | 8–20 |
| hydrophilic detackifier | 0–30 | 4–10 | 5–35 | 10–25 |
| plasticizer for hydrophilic detackifier | 0–14 | 0–8 | 1–15 | 3–12 |
| oleaginous material | 3–15 | 5–10 | 4–20 | 8–15 |
| mineral filler | 1–35 | 10–22 | 5–35 | 15–30 |
| antioxidant | 0–0.1 | 0.05–0.09 | 0–0.1 | 0.03–0.09 |
| total | 100 | | 100 | |

The masticatory substances are elastomeric materials which are synthetic in origin. Such masticatory substances would include styrene-butadiene copolymer, butyl rubber (which is isobutylene-isoprene copolymer) and polyisobutylene and mixtures thereof.

The plasticizer for the masticatory substances will preferably comprise a hydrogenated ester gum, that is, a glycerol ester of hydrogenated rosin and/or dimerized ester gum. However, other resins may be employed such as pentaerythritol ester gum, polymerized ester gum, polyterpene resin and ester gum. Mixtures of such plasticizers may also be used.

The hydrophilic-type detackifier is a material which will absorb saliva and would include vinyl polymers having a molecular weight of at least 2,000, and preferably of about 2,000 to 80,000 or more, such as polyvinyl acetate, polyvinyl butyl ether and copolymers of vinyl esters and/or vinyl ethers with ethylene, as well as mixtures thereof.

The plasticizers for the hydrophilic type detackifiers would include one or more of triacetin, acetylated glycerides and other flavor adjuvants such as ethyl acetate and triethyl citrate, and others as listed in U.S. Pat. No. 4,452,820 at column 4, lines 27 to 46, the disclosure of which is incorporated herein by reference.

The oleaginous material includes waxes which are used primarily as compatibilizers/plasticizers between the elastomeric and resin phases, where such two phases are employed. Examples of the waxes are petroleum waxes such as paraffin wax and microcrystalline wax; the polyethylene waxes; and natural waxes derived from either plant or animal sources such as candelilla wax, carnuba wax and bees wax.

The oleaginous material may also include hydrogenated vegetable or animal fats, cocoa butter or other softening-emulsifying agents such as phosphatides such as lecithin and di- and tri-glycerides of fatty acids, and mixtures thereof.

The mineral fillers would include calcium carbonate, titanium dioxide, talc, alumina, tricalcium phosphate and mixtures thereof.

In addition, the gum base may include antioxidants such as butylated hydroxy toluene, butylated hydroxy anisole and propyl gallate, and mixtures thereof.

COOKED AQUEOUS HYDROGENATED STARCH HYDROLYSATE

The cooked aqueous hydrogenated starch hydrolysate used in the compositions of the present invention has a moisture content of about 30±6%, and preferably of about 10±4%. This cooked hydrogenated starch hydrolysate is prepared by cooking, or heating, commercially available aqueous solutions of the hydrogenated starch hydrolysate, which have moisture contents of about 20 to 35%, at a temperature of about 250° to 310° F., and preferably of about 260° to 290° F., until the desired low moisture content of the cooked material is attained. This may take about 0.5 to 1.0 hours for a 100 gallon batch of a commercially available aqueous solution of hydrogenated starch hydrolysate having a moisture content of about 25%.

The uncooked commercially available hydrogenated starch hydrolysate which may be used to form the cooked hydrogenated starch hydrolysate used in the composition of the present invention may be a hydrogenated corn syrup or hydrogenated starch hydrolysate of varying dextrose equivalents (DE), such as are disclosed in U.S. Pat. No. Re. 26,959 and U.S. Pat. Nos. 3,556,811, 4,279,931 and 4,382,962, as well as various hydrogenated glucose syrups and/or reconstituted powders which contain sorbitol, hydrogenated disaccharides, tri- to hexa-hydrogenated saccharides, and hydrogenated higher polysaccharides, or mixtures of any two or more of the above.

The uncooked commercially available hydrogenated glucose syrups or hydrogenated starch hydrolysates and/or powders thereof may be produced by catalytic hydrogenation of standard glucose syrups (acid and/or enzyme converted) to the point where all the glucose end groups of the saccharides are reduced to alcohols, that is, dextrose to sorbitol. In the case of hydrogenated glucose syrups, the total solids contents will usually range from about 65 to about 80%, which solids are made of from about 4 to 70%, and preferably from about 4 to about 20%, sorbitol, from about 8 to about 65%, and preferably from about 20 to about 65%, hydrogenated disaccharides (that is, mannitol), and 20 to 80% of the higher ($\geq$ tri to hepta) hydrogenated saccharides. The preferred of the uncooked commercially available hydrogenated starch hydrolysates contain from about 8 to about 45%, and preferably about 15 to 45%, tri- to hetpa-hydrogenated saccharides, and from about 10 to about 35%, and preferably about 15 to 25%, hydrogenated saccharides higher than hepta.

The commercially available hydrogenated starch hydrolysate is also referred to in the literature as hydrogenated glucose syrup, or by the trademark of tradename Lycasin polyol or Lonza polyol. The term hydrogenated starch hydrolysate will be used herein to designate such material.

The chewing gum compositions of the present invention are made with about 20±10%, and preferably, about 15±5%, of the cooked hydrogenated starch hydrolysate. When less than about 10% of the cooked hydrogenated starch hydrolysate is used the resulting products have poor flexibility properties, and when more than about 30% of the cooked hydrogenated starch hydrolysate is used, the resulting product is too soft.

The chewing gum products of the present invention may also comprise about $\geq 0$ to 12%, and preferably about 5 to 9%, glycerine.

The glycerine assists in providing long term storage flexibility, and initial softness of chew. The glycerine may be cooked with the hydrogenated starch hydrolysate and added, as such, to the chewing gum formulation, or it may be added separately. When the glycerine is cooked with the hydrogenated starch hydrolysate, the cooking temperature should not exceed the decomposition temperature of the glycerine, which is about 290° C.

The cooked hydrogenated starch hydrolysate and/or the glycerine may be added to the gum base portion, or with the non-gum base components, when formulating the products of the present invention. The cooked hydrogenated starch hydrolysate, with or without glycerine cooked therewith, is cooled to below 150° F. before being admixed with the other components of the chewing gum products of the present invention.

When the cooked hydrogenated starch hydrolysate is prepared (cooked) with less than about 4% glycerine, the resulting product is in a glossy solid state at room temperature. When the cooked hydrogenated starch hydrolysate is made with about 4 to 12% glycerine, the resulting product is liquid or is pourable at room temperature.

This solid glossy material melts, or becomes pourable, at a temperature of about 212° to 220° F. When using cooked hydrogenated starch hydrolysate in the chewing gum products of the present invention which has been made with less than about 4% glycerine, it is preferable, to facilitate the incorporation of the cooked material into the chewing gum composition, to use the cooked hydrogenated starch hydrolysate just after it has been cooked, and it is still in a heated and liquid state. It is preferably under such circumstances to allow the cooked hydrogenated starch hydrolysate (made with less than 4% glycerine) to cool down to about 150° to 160° F. before incorporating it into the chewing gum formulation.

When the cooked hydrogenated starch hydrolysate is made with about 4 to 12% glycerin, it is preferable to cool it down to about 100° to 110° F. before it is added to the chewing gum formulation.

MOISTURE CONTENT

The chewing gum products of the present invention have a total moisture content of about 2 to 7%, and preferably of about 2 to 4%.

The chewing gum products of the present invention have ERH values of about 25 to 50, and preferably of about 30 to 50, and most preferably about 30 to 40.

Equilibrium relative humidity (ERH) or relative vapor pressure is the humidity at which a foodstuff neither gains nor loses moisture and the figure is expressed as a percentage. A discussion of ERH relative to food products and a method for the determination thereof is to be found in "Chocolate, Cocoa and Confectionery," Science and Technology, Second Edition, 1980, Bernard W. Minifie, AVI Publishing Co., Inc. Westport, Conn., U.S.A., Appendix I, pp. 672–677 (the disclosure of which is incorporated herein by reference). The test procedure disclosed in such publication is the one used for testing and evaluating the compositions disclosed herein.

SACCHARIN

The saccharin that is used in the chewing gum compositions of the present invention may be used, chemically, in the form of the free acid form of saccharin, or in the form of the various commercially available salts of saccharin such as the sodium, calcium, ammonium and aluminum salts.

The total amount of saccharin used in the chewing gum compositions of the present invention is about 0.04 to 0.35, and is preferably about 0.12 to 0.26, weight % based on the total weight of the chewing gum composition. To provide the desired long term sweetness and flavor retention properties, however, the saccharin is used in two different physical or compositional forms, i.e., both encapsulated and unencapsulated. About 0.02 to 0.15, and preferably about 0.05 to 0.10, weight % of the saccharin is used in unencapsulated form, and about 0.02 to 0.20, and preferably about 0.07 to 0.16, weight % of the saccharin is used in encapsulated form.

The unencapsulated saccharin is used in the form of particles having a particle size of about 5 to 180 microns.

The encapsulated saccharin is used in the form of saccharin encapsulated in a delayed release encapsulating agent which is designed to release the encapsulated saccharin after the unencapsulated saccharin is used in the initial sweetness burst experienced by the masticator of the chewing gum. This initial sweetness burst lasts about 1 to 4 minutes. Thereafter, the encapsulated saccharin is released, by the chewing action of the masticator, so as to release the encapsulated saccharin in a second burst of sweetness.

Although the sweetness obtained from the encapsulated saccharin is being released constantly, such release is most noticeable after the initial sweetness burst. During the period of the initial sweetness burst all of the water soluble ingredients are dissolved in the mouth of the masticator. Then a second, more prolonged burst of sweetness will begin, resulting from the continued presence of encapsulated saccharin and will last about 6 to 10 minutes more during the mastication of the product, depending on the amount of saccharin that is encapsulated and the release rate of the encapsulated saccharin from its encapsulating agent.

A preferred means of encapsulating the saccharin is by the fluid bed type encapsulating process of U.S. Pat. No. 4,384,004 when using film forming encapsulating agents. Such encapsulating agents would include all film forming water insoluble polymers.

The film forming polymers must, of course, be non-toxic and of food grade quality. They must be water insoluble, i.e., in water at temperatures of at least 25° C., they must not swell more than about 30% by volume nor have a solubility in water of more than about 10% by weight. They must be capable of forming films in the encapsulating processes disclosed herein. The preferred of such polymers are organic polymers, i.e., those having a carbon backbone, and more preferably the olefin polymers, and the most preferably polyolefins. The film forming polymers should also be chemically compatible with any modifying agent used therewith, and the encapsulated flavorant, i.e., they should not undergo a chemical reaction therewith under the encapsulating and use conditions employed therewith.

The olefin polymers would include polymers containing at least 50 mol percent of one or more olefin monomers. The remainder of such olefin polymers could include up to 50 mol percent of one or more non-olefin monomers that are copolymerizable with the olefins, such as other vinyl monomers, such as vinyl esters, vinyl ethers and vinyl alcohol and acrylic monomers. These other vinyl monomers would thus include vinyl acetate, vinyl propionate, vinyl butyrate, vinyl ether, vinyl alcohol, acrylic acid, methacrylic acid, ethyl acrylate, ethyl methacrylate, methyl acrylate, and methylmethacrylate.

The polyolefins would include olefin homopolymers such as polyethylene and polypropylene and olefin copolymers of two or more olefin and monomers such as ethylene propylene copolymers.

The film forming olefin polymer encapsulating agents may be used with various types of modifying agents such as plasticizers and softeners in effective quantities therefor, i.e., about 10 to 30 weight %, based on the combined weight of the modifying agent and the film forming encapsulating agent. Some of such materials are disclosed in U.S. Pat. No. 4,384,004 the contents of which are hereby incorporated herein by reference. A preferred modifying agent, particularly for use with film forming polymers, such as the olefin polymers, and more particularly the polyolefins, is deoiled lecithin. The use of deoiled lecithin as a modifying agent for the film forming polymer in the encapsulation of an intense sweetener such as saccharin is disclosed in copending U.S. patent application Ser. No. 878,468 filed June 25, 1986, the contents of which are hereby incorporated herein by reference.

In addition to such film forming olefin polymers, other food grade film forming materials commonly used for the encapsulation of flavorants in the food and drug industry may also be used to encapsulate the saccharin for the purposes of the present invention. Such other encapsulating agents would include shellac, cellulose derivatives, gelatin based compositions, zein gums, starch derivatives and proteins as disclosed for example in U.S. Pat. No. 4,384,004; U.S. Pat. No. 4,386,106; U.S. Pat. No. 4,267,312; U.S. Pat. No. 4,230,687; U.S. Pat. No. 4,259,355 and PCT WO No. 84/03201 and U.S. Pat. No. 3,495,988. The disclosures of such references are incorporated herein by reference both with respect to the encapsulating materials and encapsulating procedures disclosed therein.

LECITHIN

The lecithin which may be used as an optional component of the encapsulation compositions of the present invention includes all the currently available forms thereof, including the heat stable forms which are admixed with oil, provided that the oil content thereof does not exceed about 25% by weight, and preferably does not exceed about 5% by weight, and most preferably does not exceed about 2% by weight. The low oil content lecithin to be used in the present invention, therefore, may also be referred to as deoiled lecithin.

ADMIXING OF DEOILED LECITHIN

When the deoiled lecithin is to be used with the film forming polyolefin encapsulating agent it is preferably used in admixture with the polyolefin coating material. This provides the most desired sweetness of flavor release results according to the present invention. The deoiled lecithin may, however, also be used in admixture with the saccharin, with such resulting admixture then being coated with the polyolefin coating material. Further, the deoiled lecithin may also be concurrently used in both the polyolefin coating material and admixed with the saccharin.

When the deoiled lecithin is used in the polyolefin coating material it is used in an amount of about 2 to 40 and preferably of about 5 to 25, weight % based on the combined weight of deoiled lecithin and the polyolefin coating material. The admixing of the deoiled lecithin and the polyolefin coating material is carried at below the decomposition temperature of either component of the admixture, and preferably by melting the polyolefin coating material and then mixing in the deoiled lecithin.

When the deoiled lecithin is used in admixture with the saccharin it is used in an amount of about 10 to 90, and preferably of about 20 to 65, weight % based on the combined weight of the deoiled lecithin and the saccharin. The admixing of the deoiled lecithin and the saccharin is carried out below the decomposition temperature of the various components, of the admixture, and by known dry blending procedures.

What is said here about the manner and means of employing deoiled lecithin as a modifying agent for the polyolefin coating materials would also apply to the use of other modifying agents for such coating materials, including the other modifying agents disclosed in U.S. Pat. No. 4,384,004.

ENCAPSULATION PROCESS

The term "IS particles", as used hereinafter refers to particles of the saccharin alone, or in admixture with the deoiled lecithin.

The encapsulated contents of the IS particles may include the saccharin, alone, or in admixture with other additives such as coloring materials, other flavorants and other active ingredients. All of these materials may be dry blended together by known blending processes.

The term active ingredient, as such, as used herein, therefore, means any solid particulate material that may be used as a component of a chewing gum product.

The term "Coating Material" as used hereinafter refers to the encapsulating agent, alone, or in admixture with the deoiled lecithin.

The Coating Material is thus used to form an encapsulating coating on the IS Particles in such a way as to provide coated, discrete, IS Particles which have a coating weight of about 20 to 80, and preferably of about 25 to 70, weight % based on the combined weight of the Coating Material and the IS Particles. The IS Particles may be encapsulated by more than one layer of the Coating Material, in accordance with the coating processes described hereinafter. In a further embodiment, the IS Particles may be coating by plural diverse Coating Materials, disposed either in mixture with each other, or in discrete layers.

The IS Particles may be encapsulated with the Coating Material by a variety of coating techniques, including spray drying, coascervation, and the like. Preferably, the IS Particles are encapsulated by a method that operates in similar fashion to fluidized bed coating processes, in that the IS Particles are suspended in an apparatus that creates a strong upward air current or stream in which the IS Particles move. The stream passes through a zone of finely atomized droplets of the Coating Material, after which the thus coated IS Particles pass out of the upward stream and pass downward in a fluidized condition countercurrent to a flow of heated fluidized gas whereupon they are dried and may reenter the upward-moving coating zone for a subsequent discrete coating application. The foregoing method and associated apparatus are known as the Wurster Process. The Wurster Process and its associated appartaus are set forth in detail in the following U.S. Patents, the disclosures of which are incorporated herein by reference: U.S. Pat. No. 3,089,824; U.S. Pat. No. 3,117,027; U.S. Pat. No. 3,196,827; U.S. Pat. No. 3,241,520; and U.S. Pat. No. 3,253,944.

The preferred fluidized bed coating process may operate at inlet temperatures in the order of about 90° to 180° F., so that only relatively mild heading of the IS Particles takes place while the Coating Material is disposed thereon. The temperatures may vary up to the decomposition point of the component(s) of the contents of the IS Particles, and for example, may range as high as 200° F.

The Coating Material is prepared for use in the preferred fluidized bed encapsulation method by the formation of a liquid capable of being uniformly atomized. In particular, solutions, dispersions or emulsions of the Coating Material in suitable solvents or dispersing agents may be prepared, depending upon the nature of the Coating Material. The encapsulating agents used in the Coating Materials may be prepared as solutions, dispersions or emulsions in appropriate organic solvents such as acetone, lower alcohols such as isopropyl alcohol, and the like. They may also be used as hot melts in the absence of solvent.

The use of deoiled lecithin with the film forming polyolefin polymer, as the preferred encapsulating agent, is helpful, from an encapsulating process point of view, when this polymeric encapsulating agent is to be used in a fluid bed type coating process and the polymeric encapsulating agent itself has a high melting point of $\geq 180°$ F., and/or a relatively wide solidification point range, of more than 1° to 2° F. By a melting point in this regard it is meant one determined by the drop melting point method (ASTM 127).

By solidification point range it is meant the temperature at which the (molten) material begins to show evidence of surface (case) hardening.

The deoiled lecithin, when admixed with the polyolefin encapsulating agent, tends to lower the melting point, and narrow the solidification point range, thereof so that the resulting encapsulating agent can be used much more readily and efficiently in the fluidized bed coating process.

Thus, in the case of the polyethylene having a melting point of about 180° to 260° F., and a solidification point range of about 170° to 250° F., the use therewith of about 2 to 40 weight % of admixed deoiled lecithin will reduce the melting point of the polyethylene to about 160° to 240° F., and narrow its solidification point range to about 155° to 235° F.

In a preferred embodiment, encapsulated IS Particles may be prepared under substantially anhydrous conditions.

By "substantially anhydrous," in accordance with the present invention, it is meant that the IS Particles are encapsulated while in solid form, as distinguished from the disposition of the IS Particles in an aqueous emulsion that might take place if the IS Particles were encapsulated with a Coating Material by the spray drying technique.

In some instances, it may be desirable to add other ingredients such as those having a plasticizing action to the Coating Material to improve the properties of the ultimate coating. Suitable plasticizers would include the glyceryl ester of sebacic acid, diethyl phthalate, glyceryl triacetate, tributyl citrate, acetylated monoglyceride, citric acid ester of monodiglyceride, adipate ester, and others. The plasticizers may be added in known effective amounts within the scope of the invention. Other known materials acceptable for ingestion, may also be utilized herein.

In the preferred fluidized coating process the Coating Materials are projected through an appropriately sized nozzle to form an atomized cloud of Coating Material particles. The Coating Materials may be projected at a rate of flow ranging from about 10 up to about 500 ml/minute and the IS Particles may receive their first coating within 3 to 10 seconds. The time required for the entire process may naturally vary depending upon the extent of coating desired, and can range from 10 minutes to 4 hours. Naturally, the foregoing parameters are for purposes of illustration only, and may vary depending upon the nature of the Coating Material, the nozzle utilized in the coating apparatus and the desired extent of encapsulation.

The encapsulated IS Particles may be prepared in a variety of sizes, and preferably of about 40 to 425 microns.

USE OF ENCAPSULATED IS PARTICLES

When using the encapsulated IS Particles in food and other products enough of the encapsulated IS Particles is used as to provide about 0.05 to 3.0, and preferably about 0.09 to 1.50 weight % of the encapsulated IS Particles to the end use product. Where the encapsulated material contains the saccharin about 0.01 to 1.50, and preferably about 0.02 to 0.75, weight % of the saccharin is employed in this way. Thus, where the encapsulated IS Particles contain a relatively small amount of the saccharin or other active material therein, more of such IS Particles would be needed to provide the desired level of saccharin in the end use product than where the encapsulated IS Particles contained a relatively larger amount of the saccharin or other active material therein.

In order to provide for a more staged release of the saccharin or other active material during the mastication of the end use product in which the encapsulated IS Particles are used, encapsulated IS Particles made with various weights of thicknesses of coatings may be used. Thus, as the end use product is masticated the unencapsulated water soluble additives are first absorbed by the saliva of the masticator and then the encapsulated saccharin or other active material will be first released from those encapsulated products having the thinnest coatings, and then progressively, from those of the encapsulated products having progressively larger coating weights or thicknesses. Thus, the staged release of the encapsulated saccharin or other active ingredient may be obtained by using a master blend of two or more encapsulated IS Particle based compositions wherein each of the respective compositions contains a coating weight that differs from the coating weights of the other compositions by about 5 to 50, and preferably by about 10 to 30, percent.

The encapsulated saccharin is particularly useful when used in sugarless chewing gum products in combination with sugarless bulk sweeteners such as sugar alcohols, such as sorbitol, sorbitol syrup, mannitol and xylitol and hydrogenated starch hydrolysate, as well as with the unencapsulated saccharin. This combination of unencapsulated saccharin, encapsulated saccharin and unencapsulated bulk sugarless sweetener when used in a sugarless chewing gum product does not give rise to a hiatus between the up-front flavor burst from the bulk sweetener and/or the unencapsulated saccharin; and the subsequent prolonged flavor release from the encapsulated saccharin, that the prior art sugarless products are subject to when chewed by the user thereof.

The chewing gum products of the present invention do not contain a liquid filling, they are completely solid materials.

When made in stick form, the chewing gum products of the present invention are flexible. When prepared in stick from the sticks are about 0.065 to 0.072 inch in thickness, about ¾ inch in width and about 2⅞ to 3 inches in length.

The flexibility of the stick products of the present invention and those of the prior art products can be evaluated by the following test procedure:

A single stick of gum, which is at room temperature, i.e., 20°-25° C., is held between the thumb and index finger of both hands, along the wide sides of the stick, and within 0.5 to 1.0 inch of each end of the stick, and is then slowly twisted in opposite directions relative to the long axis of the wide side of the stick. A stick of gum made according to the present invention, which has good flexible properties, will bend or shape, without breaking or crumbling, after at least two or three 180° turns of the fingers, into a helical shaped structure before tearing.

A non-flexible stick of gum, on the other hand, will typically break up or crumble after, or before, the completion, of only one 180° turn of the fingers.

The flexibility properties of stick chewing gum products made according to the present invention will last during prolonged storage of such products, i.e., for at least 9 to 12 months, when the products are stored at 40 to 70% relatively humidity and at 20° to 30° C.

Although many prior art sugarless stick regular chewing gum products may pass the above described flexibility test when they are freshly made, and are warm, they will not do so after they have cooled down to room temperature i.e., 20°-25° C.

CHEWING GUM COMPOSITIONS

The chewing gum compositions contemplated by the present invention comprise all types of sugarless chewing gums and chewing gum formulations known to those skilled in the art, including the regular gum and the bubble gum types. Typical chewing gum compositions comprise a chewing gum base, a modifier, a bulking agent or sweetener, and one or more other additives such as flavoring agents, colorants and antioxidants. The modifying agents are used to soften, plasticize and/or compatibilize one or more of the components of the gum base and/or of the formulation as a whole.

The chewing gum products of the present invention would have the following formulation:

| Component | Weight Percent of Component | |
|---|---|---|
| | Broad Range | Preferred Range |
| gum base | 15 to 35 | 20 to 30 |
| cooked hydrogenated starch hydrolysate | 10 to 30 | 10 to 20 |
| glycerin | 0 to 12 | 3 to 9 |
| modifying agent other than glycerin | 0 to 5 | 0.3 to 3.0 |
| unencapsulated saccharin | 0.02 to 0.15 | 0.05 to 0.10 |
| encapsulated saccharin* | 0.02 to 0.20 | 0.07 to 0.16 |
| non-nutritive sweetener (other than saccharin) | 0 to 2 | 0.1 to 0.4 |
| bulking agent or bulk sweetener | 20 to 70 | 30 to 50 |
| coloring agent | 0.1 to 0.5 | 0.15 to 0.3 |
| flavoring agent (other than sweetener) | 0.5 to 2.5 | 0.18 to 1.2 |
| moisture** | 2 to 8 | 2.0 to 5.0 |
| Total | 100 | 100 |

*encapsulated saccharin contains 80 to 20 weight % saccharin and 20 to 80 weight % encapsulating agent, with or without other components.
**moisture content contributed by all components If desired, the saccharin may be employed together with another non-nutritive or artificial or intense sweetener such as poorly water-soluble, as well as water-soluble sweeteners such as aspartame, dihydrochalcones, glycyrrhizin, dipotassium glycyrrhizin, glycyrrhizic acid/ammonium salt, talin, acesulfame K, as well as *Stevia rebaudiana* (Stevioside), *Richardella dulcifica* (Miracle Berry), *Dioscoreophyllum cumminisii* (Serendipity Berry), free cyclamic acid and cyclamate salts, and the like, or mixtures of any two or more of the above.

The flavoring which can be included in the chewing gum compositions made according to this invention can comprise one or more natural and/or synthetic flavors and/or oils derived from plants, leaves, flowers and fruit. Representative flavors and oils of these types include acids such as adipic, succinic and fumaric acid; citrus oils such as lemon oil, orange oil, lime oil and grapefruit oil; fruit essences, such as apple essence, pear essence, peach essence, strawberry essence, apricot essence, raspberry essence, cherry essence, plum essence and pineapple essence; essential oils such as peppermint oil, spearmint oil, mixtures of peppermint oil and spearmint oil, clove oil, bay oil, anise oil, oil of nutmeg, oil of sage, oil of bitter almonds, cassia oil and methylsalicylate (oil of wintergreen). Various synthetic flavors, such as those for a mixed fruit, may also be incorporated in the chewing gum with or without conventional preservatives.

In addition to the above, the chewing gum made by this invention an also contain conventional FD & C and natural coloring agents.

GENERAL PREPARATION OF CHEWING GUM PRODUCT

The chewing gum products of the present invention are prepared by first separately preparing the bum base. To then prepare the sugarless chewing gum formulations, the gum base for the product is melted, at a temperature about 190° to 250° F., and the other components of the composition are added thereto. The resulting composition is uniformly admixed. Each of the components if usually separately added to the fomrulated composition and uniformly mixed in before the next component is added. All of the admixing operations are conducted at temperatures in the range of about 115° to 185° C., and preferably of about 115° to 130° C., for a total mixing time, at such temperatures, of about 10 to 20 minutes. These operations do not have to be conducted under anhydrous conditions in preparing the compositions of the present invention, and any amounts of moisture that are normally present in the raw materials, other than the uncooked hydrogenated starch hydrolysate, that are used in the compositions of the present invention do not usually have to be removed therefrom either prior to, or during, the formulating process. The one exception to this concept of not removing water occurs when using rubber latices as the source of the masticatory substance. As in prior art practice, the moisture content of the latex is, essentially, normally removed after coagulating the latex.

The chewing gum formulations disclosed herein may thus be prepared, and processed into chewing gum products, using conventional chewing gum formulation mixing, processing and packaging equipment and concepts.

The following examples are merely illustrative of the present invention and are not intended as a limitation upn the scope thereof.

PREPARATION OF CHEWING GUM COMPOSITIONS

Various chewing gum compositions were prepared using various of the gum bases prepared as described above. In preparing the chewing gum compositions, they were prepared in pilot plant sized batches in paddle mixers. In preparing each batch, the previously prepared gum base is melted at a temperature of up to about 245°±5° F. and is premixed with (oily) lecithin (oil content of about 50%) and color additive, and, optionally, the cooked hydrogenated starch hydrolysate, and glycerine, if the latter is used, until the temperature drops to about 185° to 189° F. Then there is sequentially added powdered sorbitol (at a temperature of 180° F.), liquid flavor (i.e., peppermint), liquid sorbitol, if used, glycerin, if used, alone or with the cooked hydrogenated starch hydrolysate, if the latter is not premixed with the gum base, any additional flavorants, and finally the encapsulated and unencapsulated saccharin and, optionally, any other intense sweeteners. Each component is paddle mixed in before the next is added. Each mixing step takes about 0.5 to 5.0 minutes and the total mixing time is about 10-20 minutes. The resulting product is recovered and further processed and packaged using conventional chewing gum making procedures.

The cooked hydrogenated starch hydrolysate used in the chewing gum compositions evaluated in the Examples had a moisture content of 7.5% or 11.5% and was prepared by cooking, at 250° to 310° F., a commercially available aqueous hydrogenated starch hydrolysate which had a solids content of 75±1%, a monosaccharide content of about 6 to 8%, a disaccharide content of about 50 to 55%, and a higher saccharide content of about 38 to 48%. The higher saccharides were about 20 to 25% in the 3-7 DP (degree of polymerization) range, and about 18 to 23% in the >7 DP range.

Unless otherwise indicated, the total water content reported below for each of the chewing gum formulations of the Examples is a calculated amount based on the water content of the cooked hydrogenated starch hydrolysate (HSH), aboiut 10±6%, and glycerine, about 1 to 4%, (where used) plus any added water used in the respective formulations. The actual water content of these formulations is about 0.2 to 0.5% higher than the reported calculated values, since such additional amounts of water enter the final formulated product from the other components of the formulation and from the ambient atmosphere. The total of the reported weight percents for the respective formulations of these Examples will thus total about 100% plus the respectively reported calculated water contents.

The test formulations were prepared using batch pilot plant procedures. Prior to beginning the pilot plant batch making process, a batch of cooked HSH/glycerine was prepared, and then split into two half batches each of which contains one-half of each of the formulated amounts of the glycerine and the cooked hydrogenated starch hydrolysate that are to be used in making the product of each example. One of the such premixtures is then used in each of steps 3 and 6 noted below.

STEP-WISE PILOT PLANT PROCEDURE

1. Into a pre-warmed sigma bladed mixer add molten gum base. The gum base temperature should be between 150°-200° F., and preferably between 170°-190° F.

2. With the blades of the mixer operating, and the temperature in the cited range, the (oily) lecithin (with about 50% oil content) is added and the mixing is continued for one minute.

3. Add one half of the cooked HSH/glycerine premixture, or the first ½ of the HSH, and mix for two minutes, or until homogeneous.

4. Add ½ of the sorbitol powder and continue mixing for two minutes.

5. The liquid flavor is then added and mixing is continued for one minute.

6. Add the second half of the cooked HSH/glycerine premixture, or the second ½ of the cooked HSH, and mix for two minutes.

7. Add the remaining sorbitol powder and all the non-nutritive sweeteners. Prior to production of the batch, all the non-nutritive sweetener is premixed with a small portion of the sorbitol powder. Continue mixing for two minutes, or until the batch is homogeneous. The final gum temperature is approximately 112° F.

8. The gum is removed from the mixer and conditioned at 70° F./42-55% R.H., prior to forming.

9. The gum is rolled and scored into a stick configuration. Mannitol is applied to the surface of the scored gum to prevent surface adhesion. The gum is then packaged in fin-seal foil pouches and sealed.

EXAMPLE 1

Preparation of Encapsulated Saccharin

Sodium saccharin is encapsulated with 60±5 weight % of polyethylene. The sodium saccharin is used in particulate form.

The encapsulation is accomplished by the "so-called" Wurster process using a 9" diameter, 18" high column fluidized bed coating chamber. The fluidizing air temperature at the fluidizing gas inlet of the chamber is about 90° to 170° F. and at the gas outlet is about 100° to 170° F. The saccharin is charged into the chamber, and fluidized and encapsulated in the column using an atomized spray of molten polyethylene. The atomized admixture is fed to the column through an atomizer in the base of the column. The encapsulated composition contains about 60% of the coating composition and about 40% of the sodium saccharin. The coating material in the form of discrete particles having an average particle size of about 425 microns.

EXAMPLES 2 TO 4

Using the pilot plant procedure described above three (3) chewing gum products are prepared, as Examples 2 to 4, from the formulations shown in Table I below, wherein the respective amounts of the components of such formulations are given in % by weight.

TABLE I

|  | Formulations For Examples | | |
| --- | --- | --- | --- |
|  | 2 | 3 | 4 |
| Gum Base A | 27.0 | 27.0 | — |
| Gum Base B | — | — | 27.0 |
| Sorbitol, powder | 46.35 | 46.5 | 42.7 |
| Sorbitol, liquid | — | — | 20.0 |
| cooked hydrogenated Starch hydrolysate | 16.0 | 16.0 | — |
| glycerine | 8.5 | 8.5 | 8.5 |
| peppermint flavor | 1.0 | 1.0 | 1.0 |
| Lecithin | 0.7 | 0.7 | 0.7 |
| sodium saccharin | 0.1 | — | 0.1 |
| PE encapsulated sodium saccharin | 0.35 | — | — |
| Aspartame | — | 0.25 | — |
|  | 100 | 100 | 100 |

The gum base used in Examples 2 and 3, Gum Base A, was a styrene-butadiene rubber based gum base. The gum base used in Example 4, Gum Base B, contained both SBR elastomer and natural rubber. The cooked hydrogenated starch hydrolysate used in Examples 2 and 3 had a moisture content of approximately 8%. It also contained approximately 8.5% glycerine. The PE encapsulated sodium saccharin used in Example 2, was a particulate, spray dried material made as described above in Example 1, and contained about 40% by weight sodium saccharin and about 60% by weight polyethylene. The product of Example 2 represented the composition of the present invention. The products of Examples 3 and 4 were made for comparative purposes. Also used for comparative purposes was an off-the-shelf sample of Wrigley's Extra chewing gum. The composition of this Wrigleys chewing gum product was analyzed and such analysis showed the following components, in % by weight, 14.1% glycerine, 52.4% sorbitol; 6.9% mannitol and 24.3% gum base. The product, when analyzed, contained 0.165% aspartame, and probably contained about 0.19% aspartame when freshly made. This Wrigley product is a low moisture content chewing gum with a moisture content of about less than one percent.

Samples of chewing gum made from the formulations of Examples 2-4, and the Wrigley product, were then comparatively tested according to the standard Cochran and Cox plan 11.1 test procedure so that each product tested was given a total of 135 judgements on each of the various chewing gum characteristics or attributes for which it was tested, as noted below. The testing was conducted so as to cross-test four compositional variables, which were

| Variable | Composition |
| --- | --- |
| I | Formulation of Example 2 |
| II | Formulation of Example 3 |
| III | Formulation of Example 4 |
| IV | Wrigley product, as described above. |

These four compositional variables were cross tested by the population of testers employed, according to the following cross-test scheme:

| Variables Being Cross-Tested | N (population of testers) |
| --- | --- |
| I vs III | 45 |
| I vs II | 45 |
| I vs IV | 45 |
| II vs III | 45 |
| I vs IV | 45 |
| III vs IV | 45 |
|  | 270 |

In conducting the test program disclosed herein, the four test products (Variables I to IV) were comparatively tested in what is known as a sensory test procedure by submitting the test samples, in duplicate, to a population of testers, from the general public, who were prescreened with respect to age, sex and frequency of use of sugarless chewing gum. The tests were conducted at a central testing location to which the testing population came, specifically, for the test purposes. Each member of the test population sequentially chewed two pieces of gum, within a period of about 30 minutes, for each test sample for each test sitting. During each test sitting the tester would chew for 10 minutes, rest for 10 minutes and then chew again for 10 minutes. The testers then numerically rated the tested gum products both hedonically and directionally for the individual chewing gum characteristics of flavor strength, sweetness, texture (hardness) and mouthfeel, periodically, over seven minutes of chewing time. The numerical ratings for such tests, which were rendered at the end of about each 0.5 to 1.0 minute of test time during the full seven minute test run, were on a scale of 1 to 5 hedonically, with the higher numerical hedonic rating representing the more acceptable level, to the tester, of the attribute being evaluated. The testers also rated the individual product attributes being evaluated directionally, on a numerical scale of 1 to 5, with the numerical value 3±0.2 on such scale being the optimum value of acceptable quality for the attribute being tested, and the terminal values of 1 and 5 on such scale representing the two extremes for the attribute being tested. In addition, each tester also provided an overall hedonic rating, on a numerical scale of 1-9, for each product, with, again, the higher numerical ratings within such scale representing the more acceptable levels, to the tester, of the overall quality of the test products.

The demographic make-up of the test population, which was determined by the prescreening of the potentially available testing population, was as follows:
 49% were of the ages of 13-18
 51% were of the ages 19-34
 58% were female
 42% were male The test population also indicated that they had previously used commercially available sugarless chewing gum as follows:

| Frequency of Use of Sugarless Chewing Gum | % of Test Population |
| --- | --- |
| less than once a month | 16 |
| once a month | 37 |
| several times a month | 29 |

| -continued | |
|---|---|
| Frequency of Use of Sugarless Chewing Gum | % of Test Population |
| several times a week | 12 |
| everyday | 6 |
| | 100 |

TEST RESULTS

The results obtained during the test procedure followed as outlined above were as shown in the following Tables of data, or in the drawings.

Table II, below, thus shows the overall acceptability ratings given by the testers to the four products evaluated in terms of numerical hedonatic ratings therefor, as well as in terms of the % of the test population showing preferences for the respective products. This data shows that, overall, there was a significant preference for product I over the other three products.

TABLE III

PAIRED COMPARISONS OF PRODUCTS I TO IV

| Pairs of Products Compared (A/B) | N | Overall Hedonic Rating (A/B) | Overall Preference in % (A/B) |
|---|---|---|---|
| I/III | 45 | 6.4/5.8 | 53/47 |
| I/II | 45 | 6.3/6.3 | 51/49 |
| I/IV | 45 | 6.5/6.0 | 71/29* |
| II/III | 45 | 6.3/6.1 | 60/40 |
| II/IV | 45 | 5.6/6.1 | 44/56 |
| III/IV | 45 | 5.6/6.2 | 33/67* |

*significantly different, p (= 0.05)

The average numercial ratings given, hedonically and directionally, by the total test population for each of the chewing gum attributes (flavor strenght, sweetness, texture and mouthfeel) for each of the four products tested, at each of the one, three and seven minute intervals of the respective test periods is shown below in Table IV.

TABLE IV

ATTRIBUTE RATINGS

| Product | Test Time Interval, Minutes | Flavor Hedonic | Flavor Directional | Sweetness Hedonic | Sweetness Directional | Texture Hedonic | Texture Directional | Mouth Feel Hedonic | Mouth Feel Directional |
|---|---|---|---|---|---|---|---|---|---|
| I | 1 | 4.28 | 3.19 | 4.01 | 3.47 | 4.00 | 3.26 | 3.94 | 3.21 |
| I | 3 | 3.91 | 3.00 | 3.65 | 3.22 | 3.77 | 3.26 | 3.62 | 3.26 |
| I | 7 | 3.43 | 2.60 | 3.19 | 2.91 | 3.27 | 3.40 | 3.30 | 3.33 |
| IV | 1 | 4.20 | 3.25 | 3.84 | 3.26 | 3.88 | 2.70 | 4.00 | 2.82 |
| IV | 3 | 3.79 | 2.74 | 3.59 | 2.88 | 3.69 | 2.92 | 3.72 | 2.91 |
| IV | 7 | 3.45 | 2.48 | 3.28 | 2.64 | 3.33 | 3.02 | 3.49 | 2.87 |
| III | 1 | 4.14 | 3.12 | 3.86 | 3.40 | 3.83 | 3.11 | 3.77 | 3.21 |
| III | 3 | 3.47 | 2.51 | 3.23 | 2.70 | 3.30 | 3.55 | 3.41 | 3.43 |
| III | 7 | 2.96 | 2.25 | 2.90 | 2.39 | 3.04 | 3.64 | 3.06 | 3.60 |
| II | 1 | 4.18 | 2.89 | 3.84 | 3.31 | 3.92 | 3.09 | 3.85 | 3.04 |
| II | 3 | 3.68 | 2.69 | 3.44 | 2.88 | 3.49 | 3.15 | 3.45 | 3.09 |
| II | 7 | 3.18 | 2.50 | 3.16 | 2.56 | 3.22 | 3.06 | 3.13 | 2.93 |

TABLE II

OVERALL PRODUCT ACCEPTABILITY

| Population | N | Product III | Product II | Product IV | Product I |
|---|---|---|---|---|---|
| Overall Hedonic Ratings after 7 minutes test time | | | | | |
| | | Overall hedonic opinion (average) for product indicated | | | |
| Total Population | 135 | 5.7 | 6.0 | 6.3 | 6.4 |
| Ages (13-18) | 66 | 6.0 | 6.0 | 6.6 | 6.7 |
| Ages (19-69) | 69 | 5.5 | 6.1 | 6.0 | 6.1 |
| Overall Preference after 7 minutes of test time | | | | | |
| | | Overall Preference (%) Relative to product indicated | | | |
| Total Population | 135 | 40 | 51 | 50 | 51 |
| Ages (13-18) | 66 | 32 | 49 | 52 | 68 |
| Ages (19-34) | 69 | 48 | 54 | 49 | 49 |

Table III, below, shows the overall acceptability ratings given by the testers where variable, or products, I to IV were paired off against each other. The ratings are given both in terms of hedonic numerical ratings as well as in terms of percentages of the test population. These test results also indicate that product I was as acceptable as product II and more, to significantly more, acceptable than products III and IV, respectively.

The average numerical ratings given, hedonically and directionally, by the total test population for each of the chewing gum attributes (flavor strength, sweetness, texture and mouthfeel) for each of the four products tested, at each of the one, three and seven minute intervals of the respective test periods is shown below in Table IV.

Figure 1:
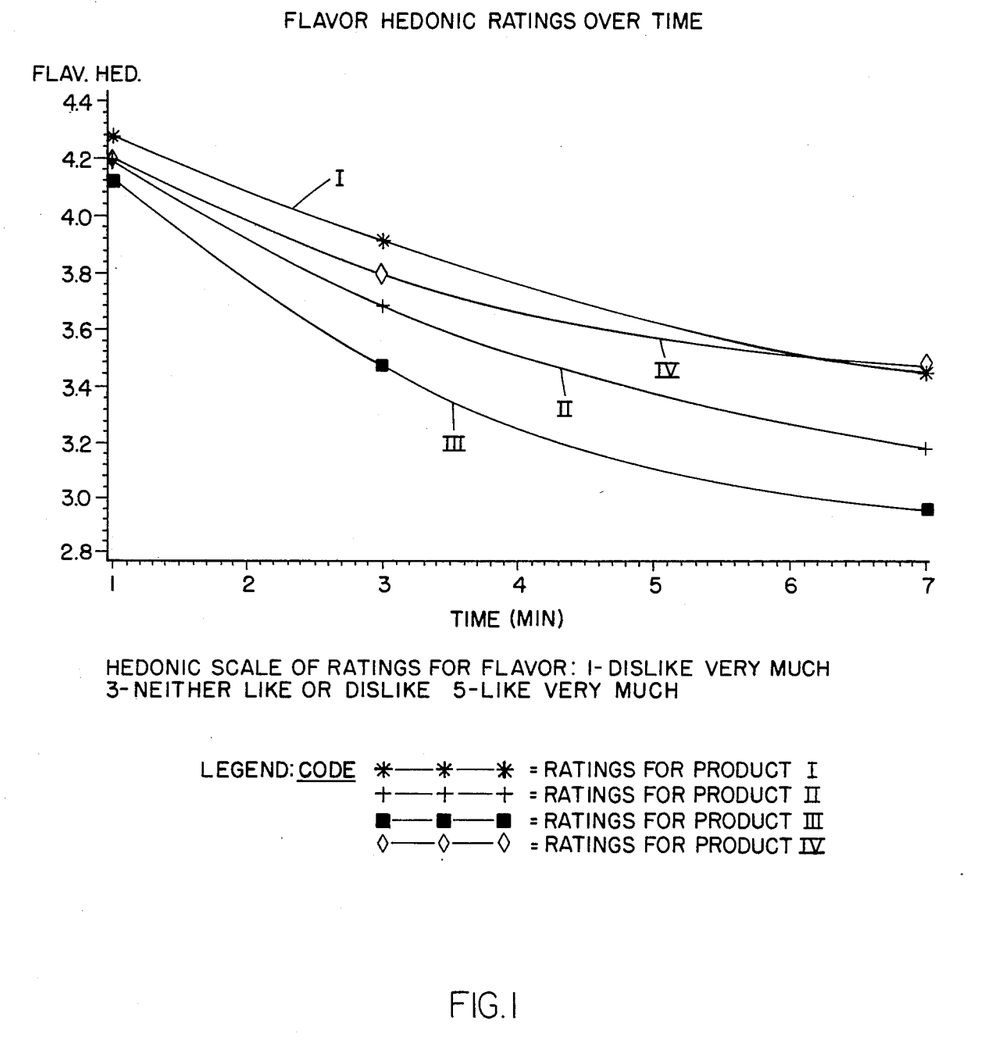
Figure 2:
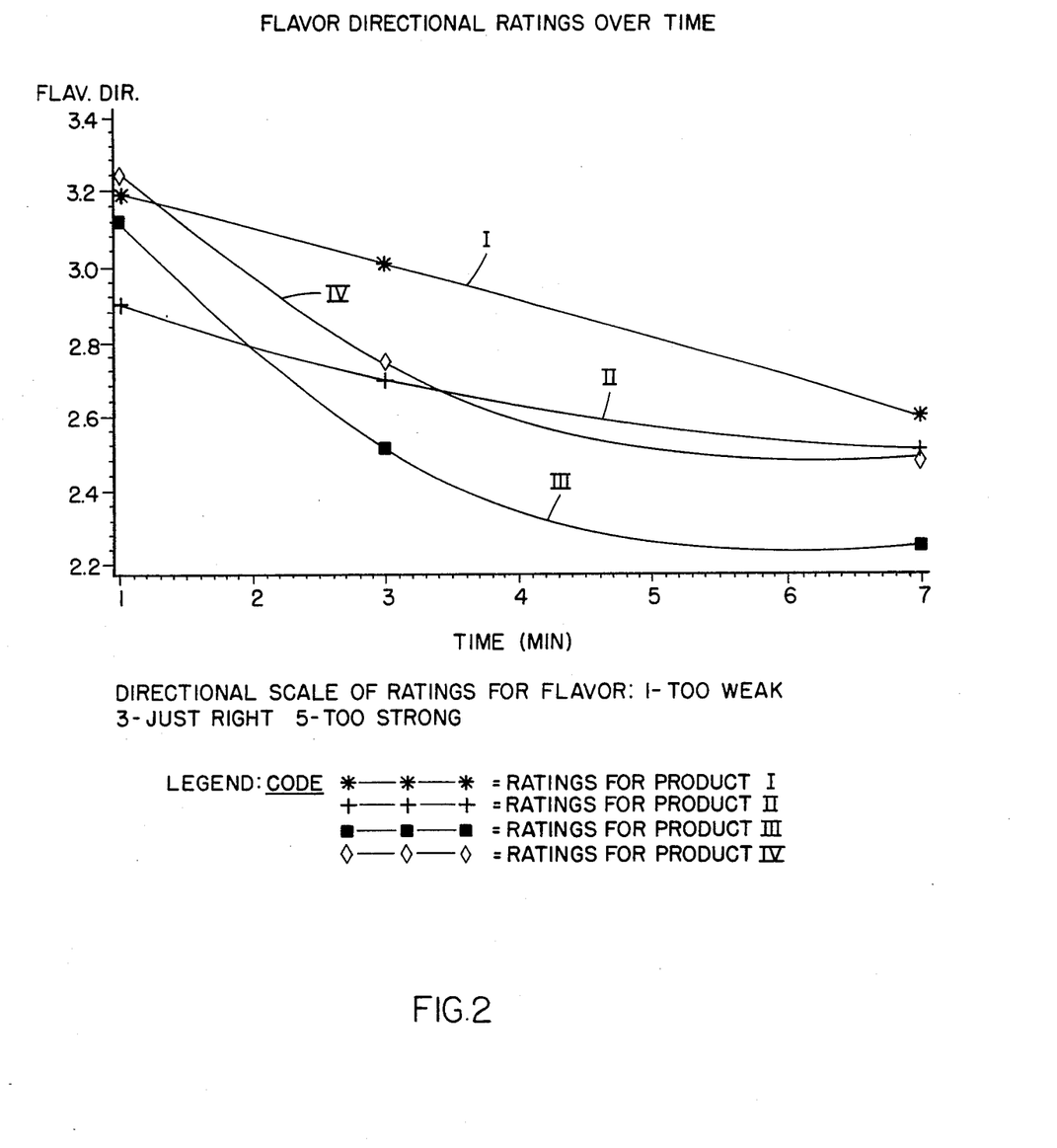
Figure 3:
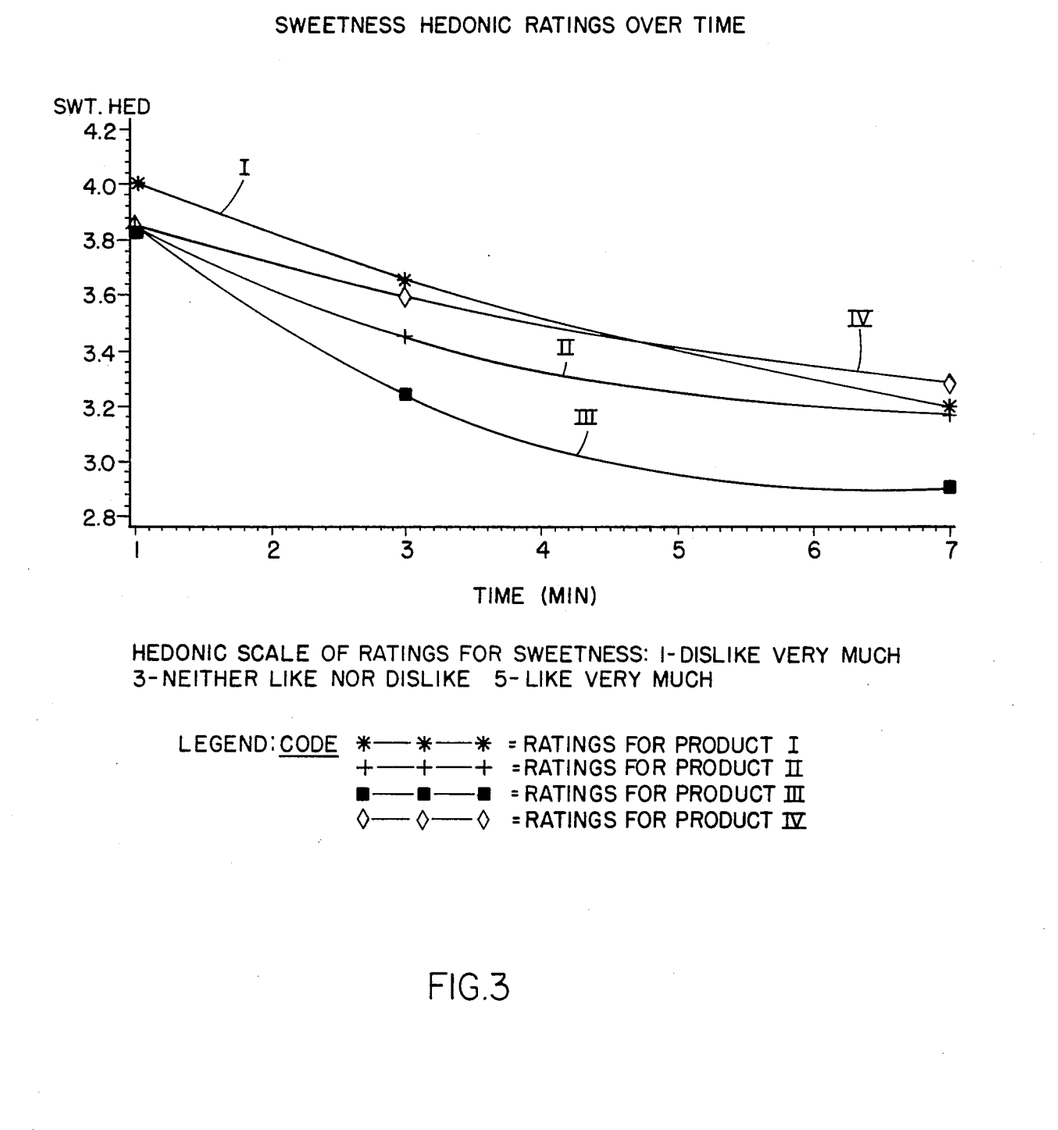
Figure 4:
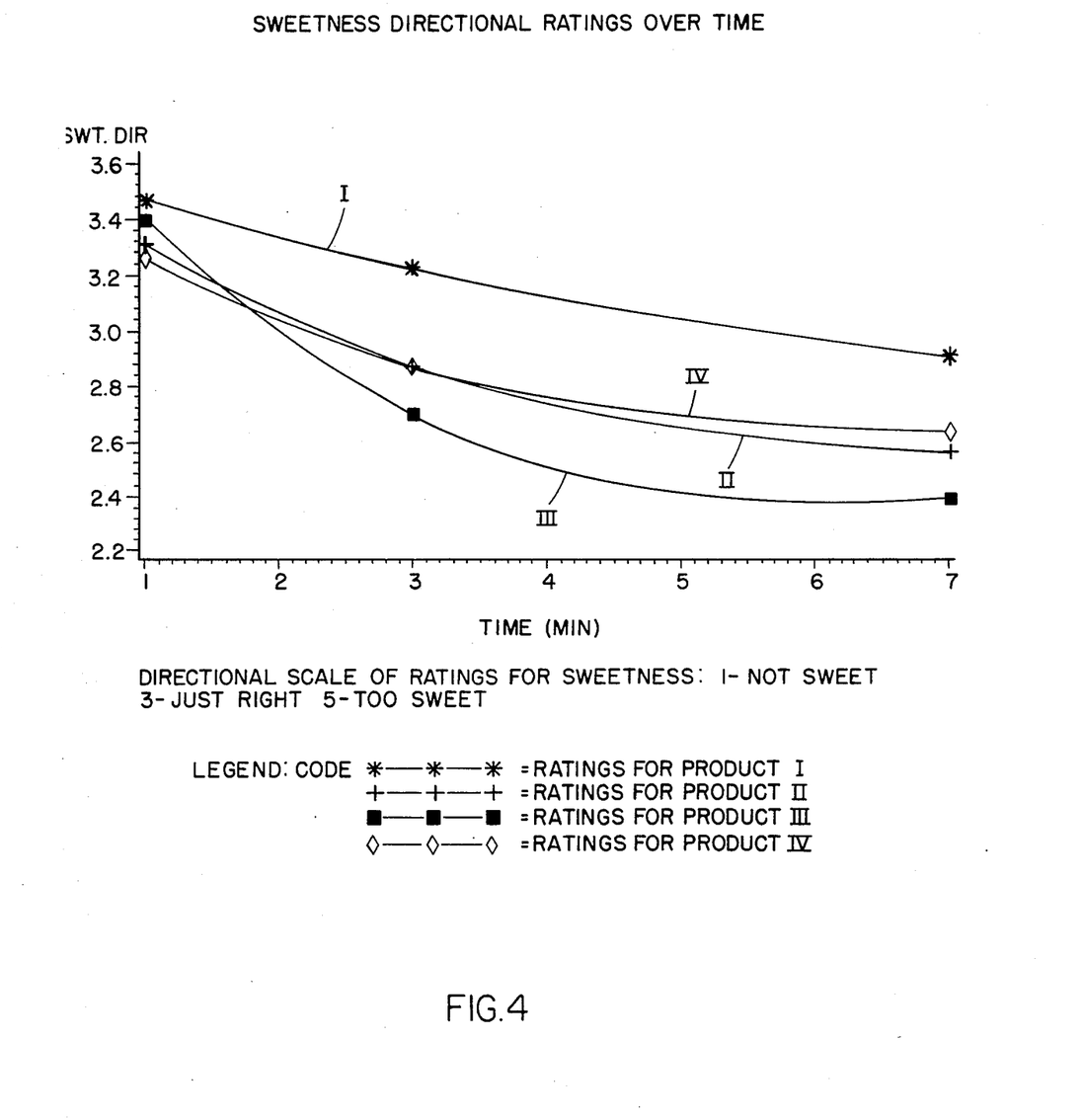
Figure 5:
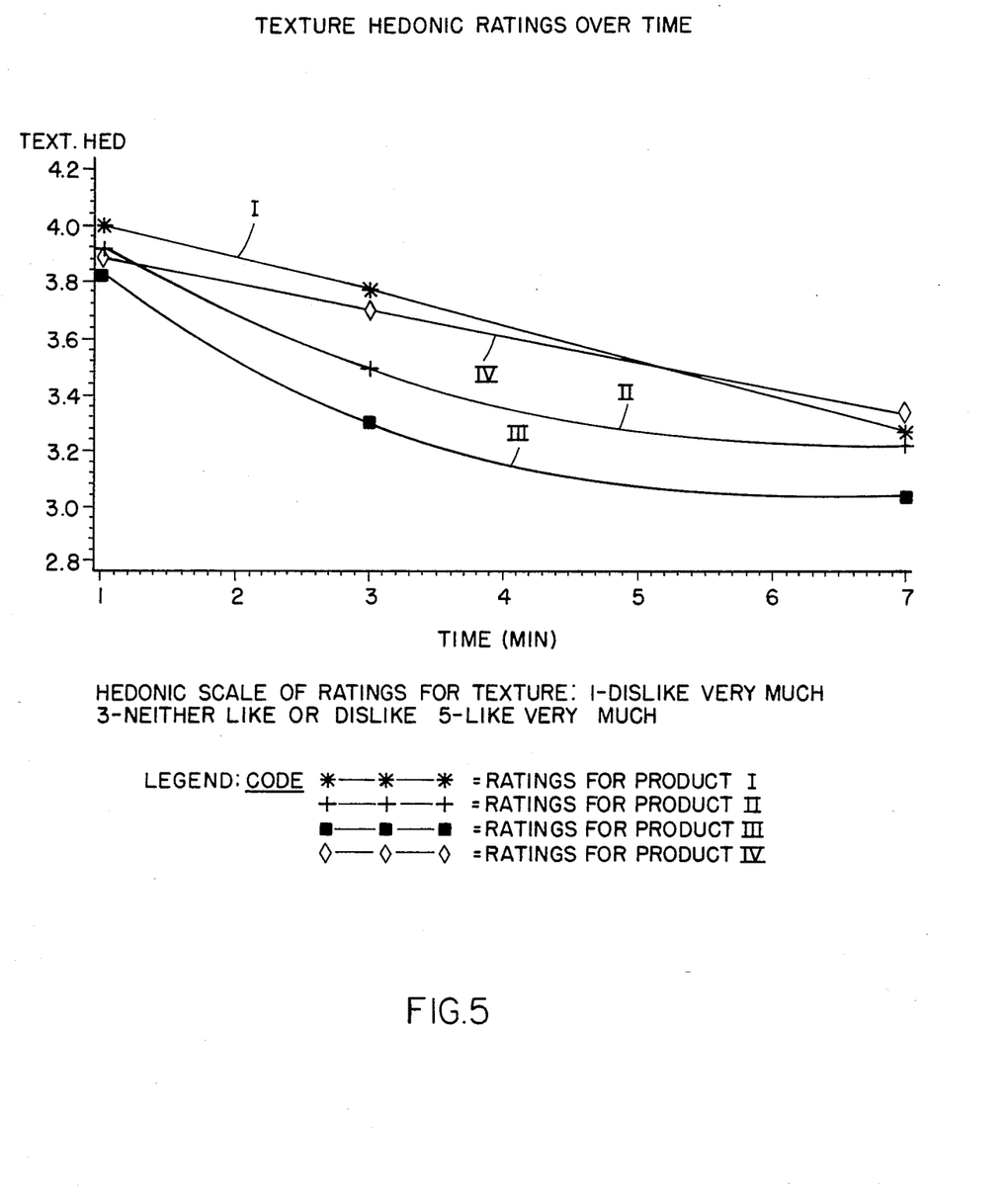
Figure 6:
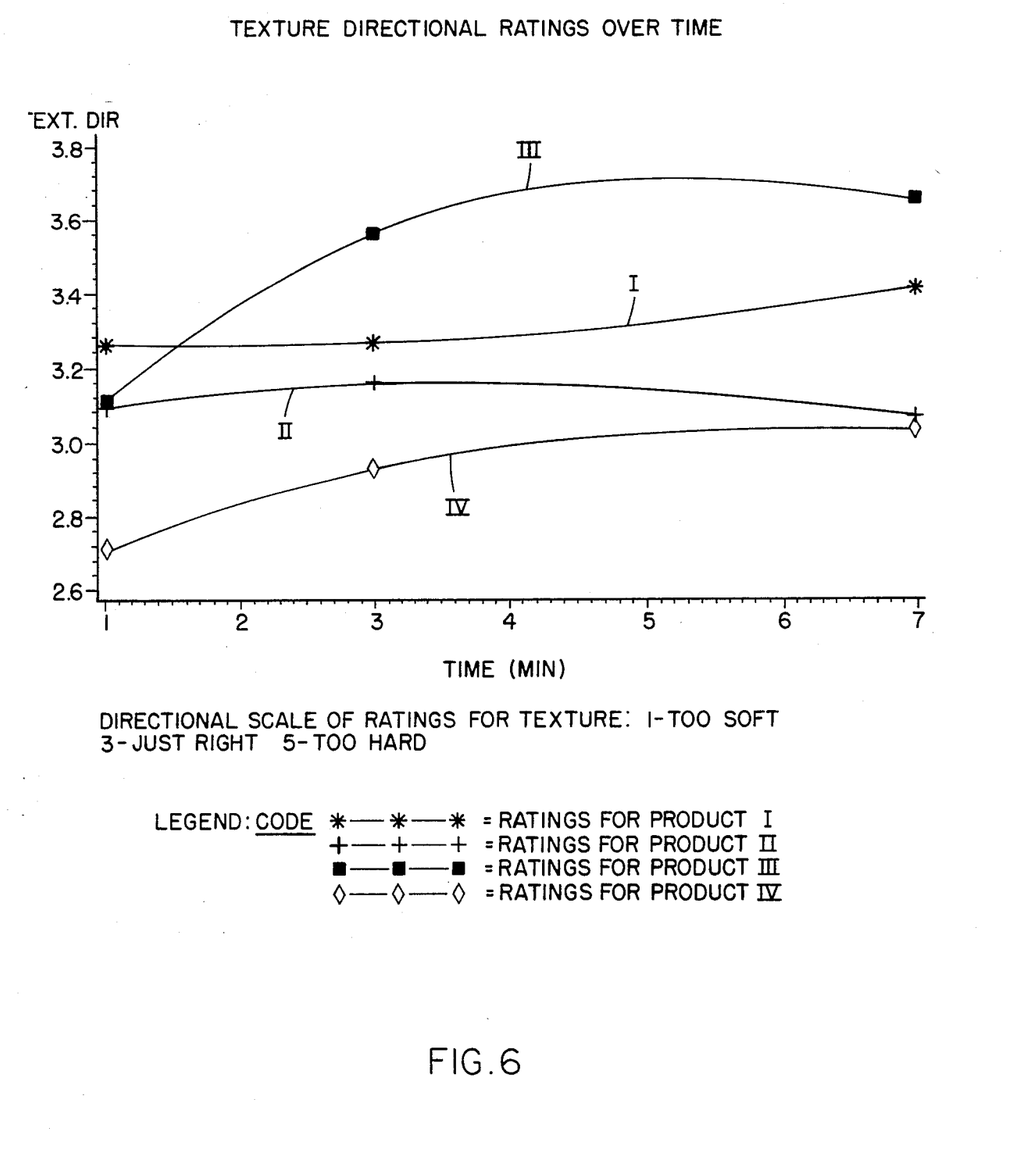
Figure 7:
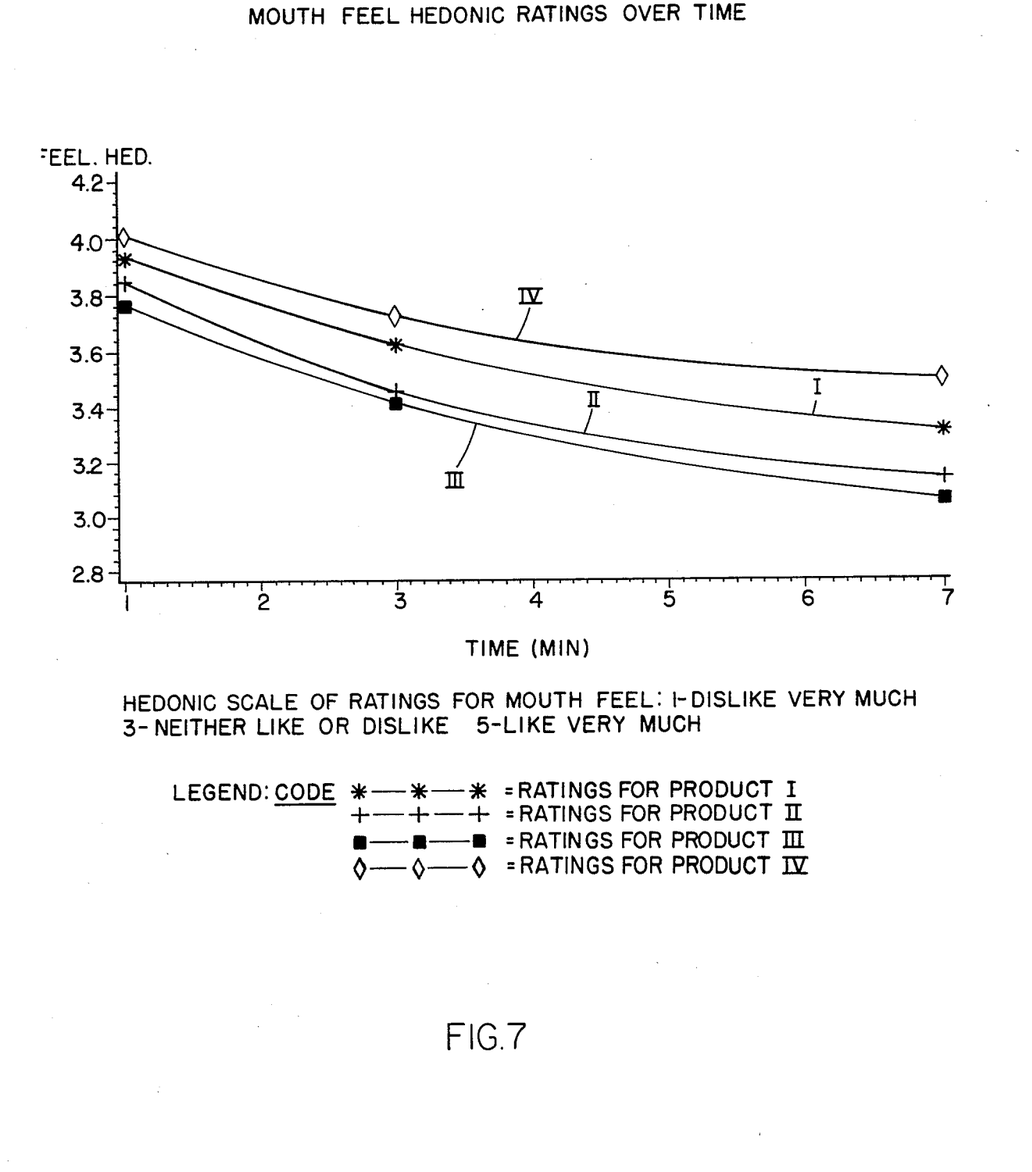
Figure 8:
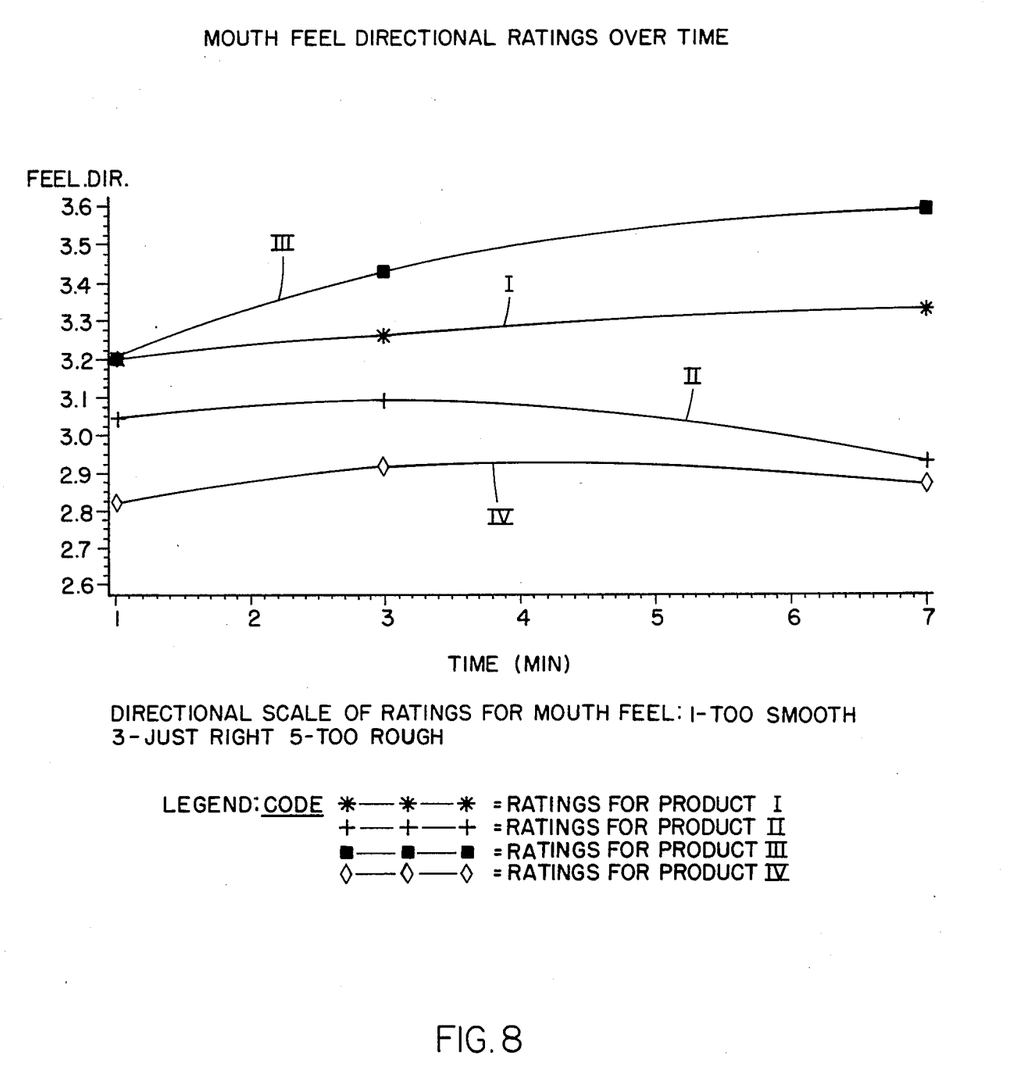

These data represented by these drawings thus shows that, with respect to the overall acceptability of product I, that of the present invention, over the other three comparatively tested products, product I had a consistent, non-varying chew profile during the mastication life of the product, and that the bolus of masticated product I did not stiffen up to any considerable extent during such life of the product, and that product I provided a relatively constant level of sweetness, having a slow gradual level of sweetness drop-off over such life of the product. Thus, these experiments showed that the encapsulated saccharin was released from its encapsulating agent substantially after the initial burst of sweetness provided by the unencapsulated saccharin and for an extended period of time after the initial burst of sweetness time so as to provide during said extended period of time a level of sweetness higher than would be provided in a comparable product formulated with the same total amount of saccharin, all in unencapsulated form. The extended period of sweetness time lasted, as shown in the Figures for at least seven minutes of test time, and, in fact lasted up to about 15 minutes (including the time for the initial burst of sweetness, the initial 1-4 minutes of test time).

The numerical results listing in Table IV are also plotted graphically in the drawings as follows.

| Figure in Drawings | Subject Matter - Graphic Depiction of Attribute Rating For |
|---|---|
| 1 | hedonic flavor ratings |
| 2 | directional flavor ratings |
| 3 | hedonic sweetness ratings |
| 4 | directional sweetness ratings |
| 5 | hedonic texture ratings |
| 6 | directional texture ratings |
| 7 | hedonic mouthfeel ratings |
| 8 | directional mouthfeel ratings |

The chewing gum products of the present invention, i.e., those of Example 2, were flexible, in stick form. When tested for flexibility, as described above, individual sticks of gum made from the product of Example 2 were twisted 3 times before breaking. These tests for flexibility were conducted, periodically, over a storage period of up to about 42 days under accelerated aging conditions of 100°–105° F. and about 30% relative humidity.

What is claimed is:

1. A saccharin containing sugarless chewing gum composition that is soft and has a continuous prolonged release of flavor and sweetness during the mastication thereof and which comprises, in weight %,
   about 15 to 35% synthetic elastomer based gum base,
   about 0.02 to 0.15% unencapsulated saccharin,
   about 0.02 to 0.20% encapsulated saccharin,
   about 10 to 30% cooked aqueous hydrogenated starch hydrolysate having a moisture content of about 10±6%,
   0 to about 12% glycerin and
   about 2 to 7% total moisture,
   said unencapsulated saccharin providing an initial burst of sweetness, and
   said encapsulated saccharin being encapsulated to such extent that the encapsulated saccharin is gradually released from its encapsulating agent after said initial burst of sweetness and for an extended period of up to a total of about 15 minutes so as to provide during said extended period a level of sweetness higher than would be provided in a comparable product formulated with the same total amount of saccharin, all in unencapsulated form.

2. A chewing gum composition as in claim 1 in which said synthetic elastomer is selected from the group consisting of styrene-butadiene copolymer, isobutylene-isoprene copolymer, polyisobutylene, and mixtures thereof.

3. A chewing gum composition as in claim 2 in which said synthetic elastomer comprises styrene-butadiene copolymer.

4. A chewing gum composition as in claim 1 in which the encapsulated saccharin is encapsulated in a film forming polymer.

5. A chewing gum composition as in claim 4 in which said film forming polymer is polyethylene.

6. A chewing gum composition as in claim 4 in which said film forming polymer is modified with deoiled lecithin.

7. A chewing gum composition as in claim 6 in which said film forming polymer is polyethylene.

8. A chewing gum composition as in claim 1 in the form of a stick shaped product.

* * * * *